United States Patent [19]

Ward

[11] Patent Number: 4,489,615
[45] Date of Patent: Dec. 25, 1984

[54] FLUID FLOW METER

[75] Inventor: Robert W. F. Ward, Bury St. Edmunds, England

[73] Assignee: Breckland Meters Limited, Mildenhall, England

[21] Appl. No.: 455,791

[22] Filed: Jan. 4, 1983

[51] Int. Cl.³ .......................... G01F 3/10; G01F 15/06
[52] U.S. Cl. .................................... 73/861.78; 73/261; 377/21
[58] Field of Search ................ 73/261, 272 A, 861.77, 73/861.78, 861.79; 377/21; 364/571, 509, 510

[56] References Cited

U.S. PATENT DOCUMENTS

| | | | |
|---|---|---|---|
| 1,996,672 | 4/1935 | Busch | 73/261 |
| 2,094,887 | 10/1935 | Herz | 377/21 |
| 2,368,019 | 1/1945 | Guibert et al. | 73/261 |
| 3,822,591 | 7/1947 | Li | 73/261 |
| 3,945,253 | 3/1976 | Liu et al. | 73/861.83 |
| 4,172,381 | 10/1979 | Aigner et al. | 73/861.77 |
| 4,253,341 | 3/1981 | Ikeda et al. | 73/861.77 |
| 4,306,461 | 12/1981 | Grebe, Jr. | 73/861.77 |
| 4,337,655 | 7/1982 | Sundstrom et al. | 73/861.77 |

Primary Examiner—Gerald Goldberg
Assistant Examiner—Hezron Williams
Attorney, Agent, or Firm—Berman, Aisenberg & Platt

[57] ABSTRACT

A flow meter comprising a cavity, an inlet to the cavity and an outlet from the cavity, and two oval rotors mounted within the cavity between the inlet and the outlet. The rate of rotation of the rotors is substantially proportional to the flow of fluid through the meter. The rotors are provided with magnets. Electrical inductors, which are capable of detecting the magnets, are arranged outside the cavity to monitor rotation of the rotors without being mechanically linked thereto, and to provide a measure of the flow of fluid through the meter. A division ratio adjuster is included in electrical circuitry of the meter to vary the calibration of the measurement in dependence upon the flow rate through the meter.

8 Claims, 11 Drawing Figures

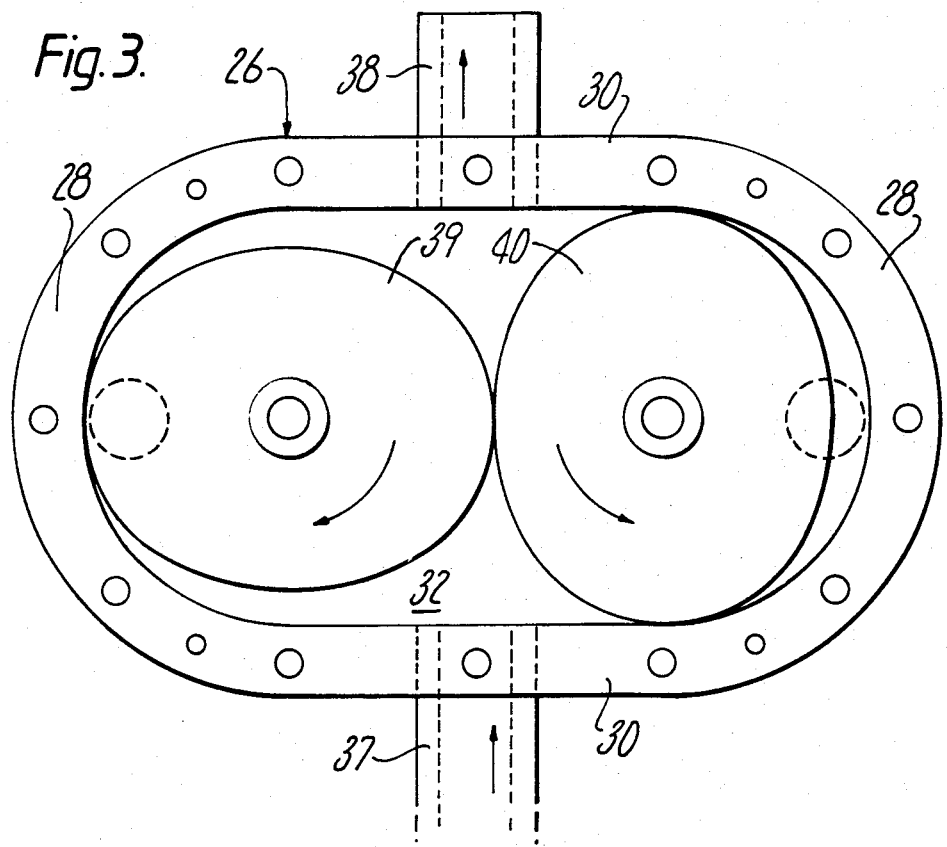
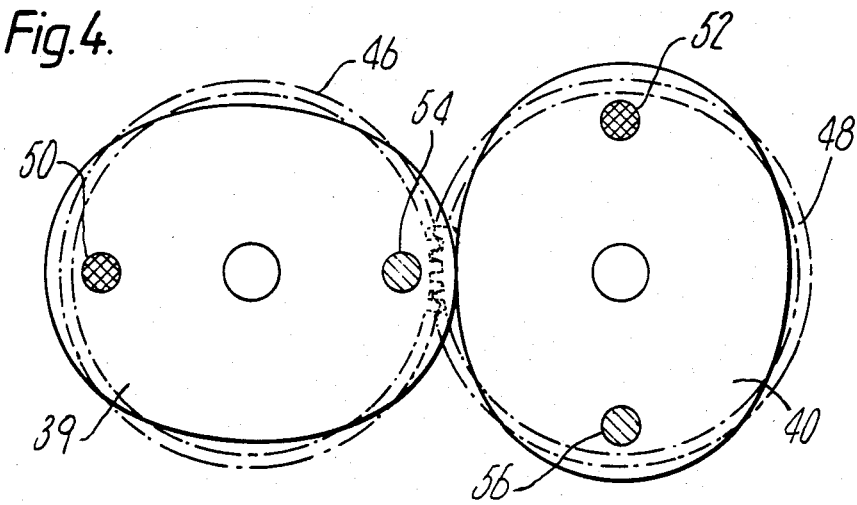

FLUID FLOW METER

This invention relates to a fluid flow meter, especially a liquid flow meter which is suitable for domestic application by the various national water authorities.

The advances in the usage, recycling and control of water in recent years reflect the need for control of water as a limited commodity caused by the continuing increases in population coupled with increased demands by agriculture and industry. This need is also made evident by political pressure sponsored by public demand for the cost effectiveness of continued support of the water services by public money. These trends may well lead to the sale or lease of water based on measured usage.

Future policies may well be dictated by the attention currently being focussed on energy conservation that could open up a completely new area in the utilisation of a pressurised water supply as a source of energy to enhance or replace electrical domestic equipment. The availability of cold water detergent may herald the design of a washing machine powered and programmed by water. Again, the desirability of metered water is highlighted.

Such arguments that have been put forward hiterto for the adoption of domestic meters have been, and are being, parried by statements of cost. For example, 80 per installation has recently been quoted, which is formidable even with individual, or government, underwritten expense. These estimates are based on currently availble meters which are invariably manufactured from metals using a larger number of machined mechanical parts.

One previously-proposed meter adopts the well proven principle of displaced volume effected by two oval rotors in a cavity of known volume. The rotors rotate in opposite senses and are at 90° to one another when one is at right angles to the direction of flow. A meter which uses this principle is known as a rotating oval flow meter. Such a flow meter is driven by the flow of water or other fluid passing through it, the speed of rotation of the rotors being in direct proportion to the amount of water displaced. Hitherto, the measurement of flow has been achieved as indicated diagrammatically in FIG. 1 of the accompanying drawings, by means of a drive 1 from one of the rotors (not shown in FIG. 1) through a sealed bearing in a wall 2 of the cavity 2 to a gear train in a gear box 3 arranged to actuate a mechanical counter 4 set in a display window (not shown in FIG. 1) via a counter-to-gear-train coupling 5.

The foregoing meter tends to exhibit one or more of the following drawbacks:

(a) rotor bearing wear resulting in seizure and flow restriction, because of the kind of bearing needed for coupling one of the rotors to the gear train;

(b) breakdown of the seal on the drive shaft between the cavity and a housing for the gearbox and/or display;

(c) use of metals in the construction which may either have an adverse effect on the water or may be adversely affected by the water to the detriment of the rotors and bearings;

(d) limitation on the selection of metals which can be used without incurring detrimental electrolytic effects;

(e) the need for a large number of machined parts resulting in high manufacturing costs;

(f) the need for a large number of moving parts which reduce the "Mean Time between Failure" factor, thus reducing reliability;

(g) no facilities for calibration by adjusting the ratio between rotor turns and turns of the counter, this being an inherent factor of design although the accuracy of the meter is directly proportional to the allowed manufacturing tolerances.

The present invention aims to provide a flow meter which is less susceptible to one or more of these drawbacks. One way it accomplishes this is to replace the mechanical linkage between one of the rotors of the meter and the counter by a magnet or other detectable device in or on one of the rotors and an electrical inductor or other detector outside the cavity.

Thus, according to one aspect of the present invention, there is provided a flow meter comprising a cavity, an inlet to the cavity and an outlet from the cavity, and a rotor mounted within the cavity between the inlet and outlet, the rate of rotation of which rotor is proportional to the flow of fluid through the meter, in which the rotor is provided with a magnet or other detectable device, and an electrical inductor or other detector, which is capable of detecting the detectable device, is arranged outside the cavity to monitor rotation of the rotor without being mechanically linked thereto. The cavity may therefore be completely sealed with no linkage member extending through its wall or walls.

The rotor may be one of two oval rotors mounted in the cavity for rotation about axes which are transverse in relation to fluid flow through the meter, in opposite senses and at 90° to one another when one of them is at right angles to the direction of flow.

Another way in which this invention accomplishes its aim is by making the cavity wall or walls, the rotor or rotors, and/or the rotor shaft or shafts and bearings out of synthetic plastics material or materials.

For example, the cavity wall or walls and a case and bulkhead of the meter may be injection moulded as one part in polypropylene or a similar material. The meter may have rotor shafts injection moulded in nylon, and rotor ovals moulded in polypropylene with encapsulated sinterred magnets.

An example of a flow meter in accordance with the present invention is illustrated in FIGS. 2 to 11 of the accompaying drawings, in which:

FIG. 3 is a rear view of the meter with a rear plate and gear wheels of rotors of the meter removed for the sake of clarity;

FIG. 4 shows the arrangement of two rotors of the meter in greater detail;

Figure 1:
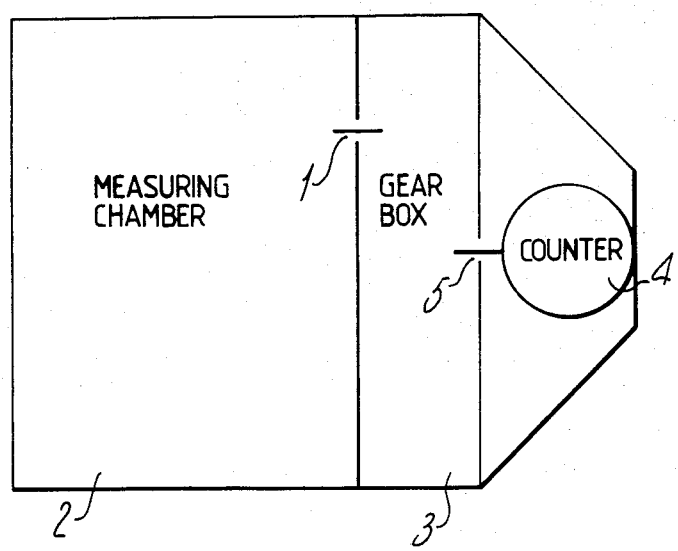
Figure 2:
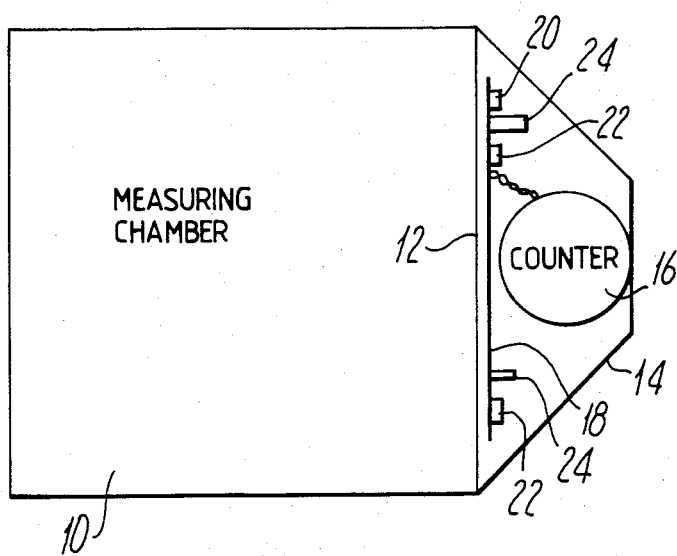
FIG. 2 is a diagram showing the basic layout of the flow meter.
Figure 5:
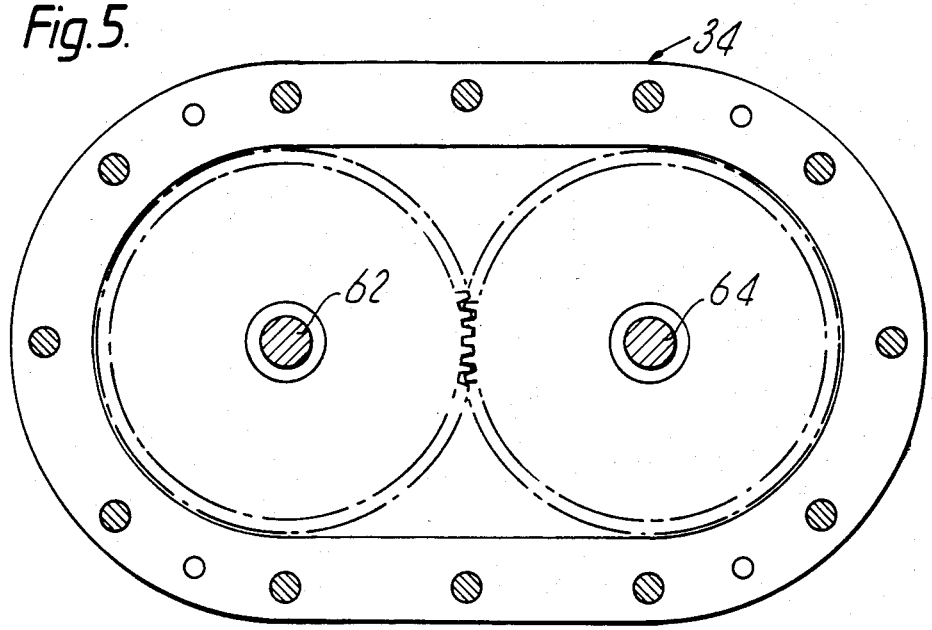
FIG. 5 shows a rear end cap of the meter.

The flow meter shown diagrammatically in FIG. 2 comprises a meter cavity 10 with a bulkhead 12 as one of the cavity walls dividing the cavity 10 from an electronic components and counter housing 14. A liquid crystal display counter 16 connected to a printed circuit board 18 is mounted within the housing 14. A number of electrical and electronic components are attached to the printed circuit board 18, including an electrical inductor or pick-up coil 20, field effect transistors 22 and other semi-conductor or electronic components 24 connected to perform the functions which are described herein.

The construction of the flow meter is shown in greater detail in FIGS. 3 to 10 of the accompanying drawings.

A polypropylene cavity and housing wall 26 of the meter is oblong in a section perpendicular to a central axis through the meter, as shown in FIG. 3. This section comprises two semi-circular portions 28 spaced apart by two straight parallel portions 30. A bulkhead 32 divides the spaced within the wall 26 into the meter cavity 10 and the electronic components and counter housing 14. The bulkhead 32 and cavity and housing wall 26 are injection moulded as one part. A rear end cap 34 shown in FIG. 5 closes off the meter cavity 10 from the exterior, and a front plate 35 closes off the housing 14. The front plate 35 has a display window 36 shown in FIG. 9, to reveal the liquid crystal display counter 16. The cavity 10 is provided with an inlet 37 and an outlet 38 provided respectively in the opposite straight portions 30 of the wall 26.

Two polypropylene rotors 39 and 40 are mounted within the cavity 10 so as to be rotatable about their respective shafts 42 and 44. These axes lie in the planes in which the semi-circular portions 28 of the cavity wall 26 meet the straight portions 30. The rotors are the same size as one another, both being oval in transverse section. The major axis of each oval is equal to the interior radius of each semi-circular portion 28, and the sum of the major axis and the minor axis is equal to the distance between the shafts 42 and 44. The geometry of the oval shape is such that, starting from positions in which the major axis of one oval is parallel to the straight portions 30 of the cavity and housing wall 26 and the major axis of the other oval is at right angles to those straight portions, the ovals always touch one another along a line parallel to and between the shafts 42 and 44 for equal rotations of the two rotors in opposite senses.

FIG. 4 shows respective intermeshing gear wheels 46 and 48 fixed to the rear sides of the rotors 39 and 40 to ensure that the two rotors always rotate in opposite senses to one another by the same angular amount. The gear wheels may each be made with the corresponding rotor as one part. Respective sintered magnets 50 and 52 are encapsulated in the rotors 39 and 40 close to an outer extremity of the major axis in each case, with weights 54 and 56 counterbalancing the magnets close to the opposite extremities of the major axes.

Figure 6:
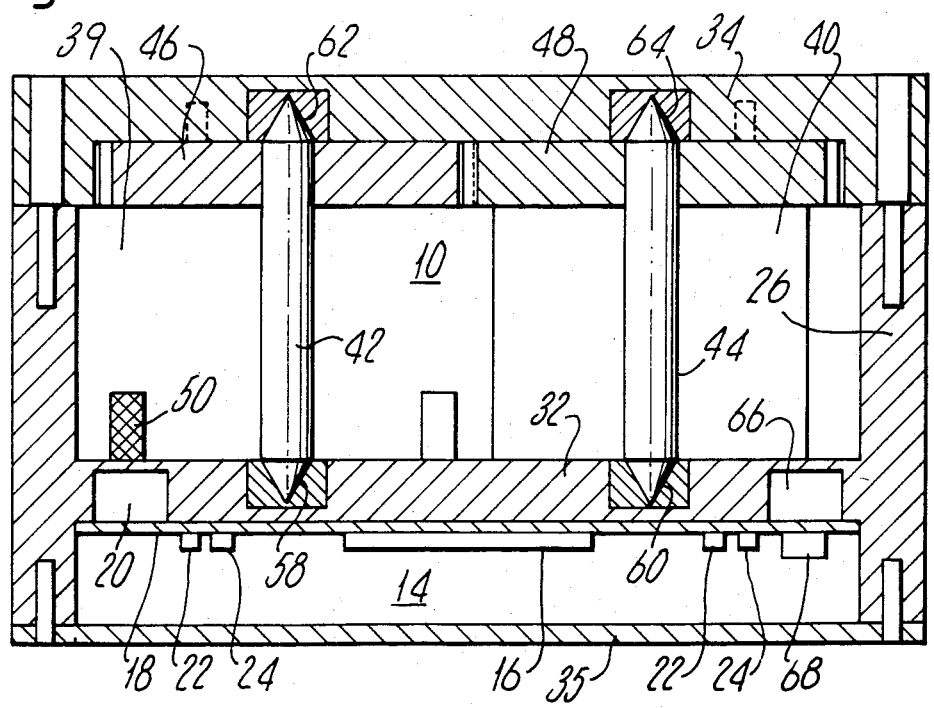
FIG. 6 shows an axial sectional view through the flowmeter.
Figure 7:
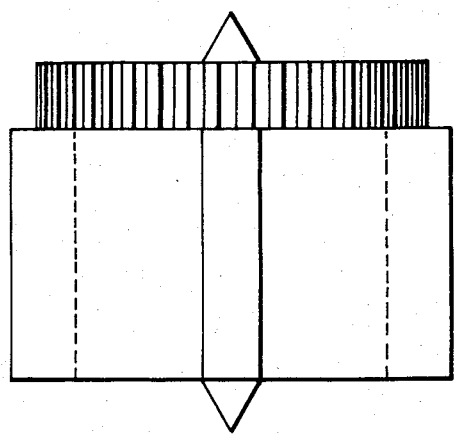
FIG. 7 shows an axial sectional view of one of the rotors of the flowmeter, a section at right angles to that shown in unbroken lines being shown by the broken lines.
Figure 8:
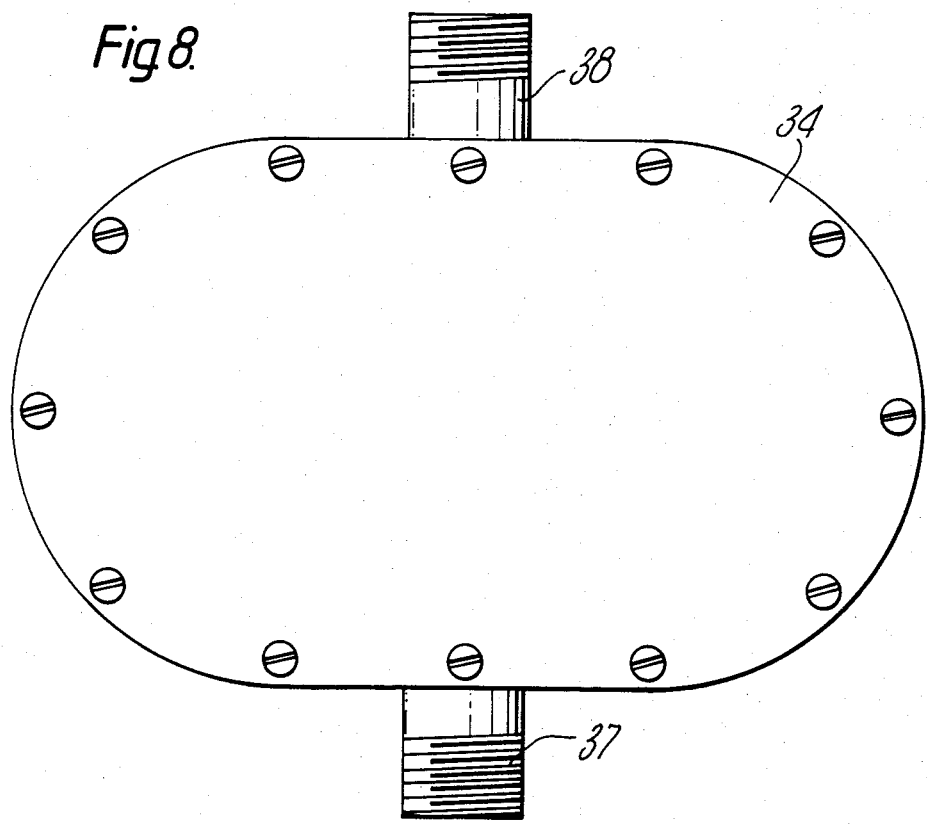
FIG. 8 shows a rear view of the flowmeter.
Figure 9:
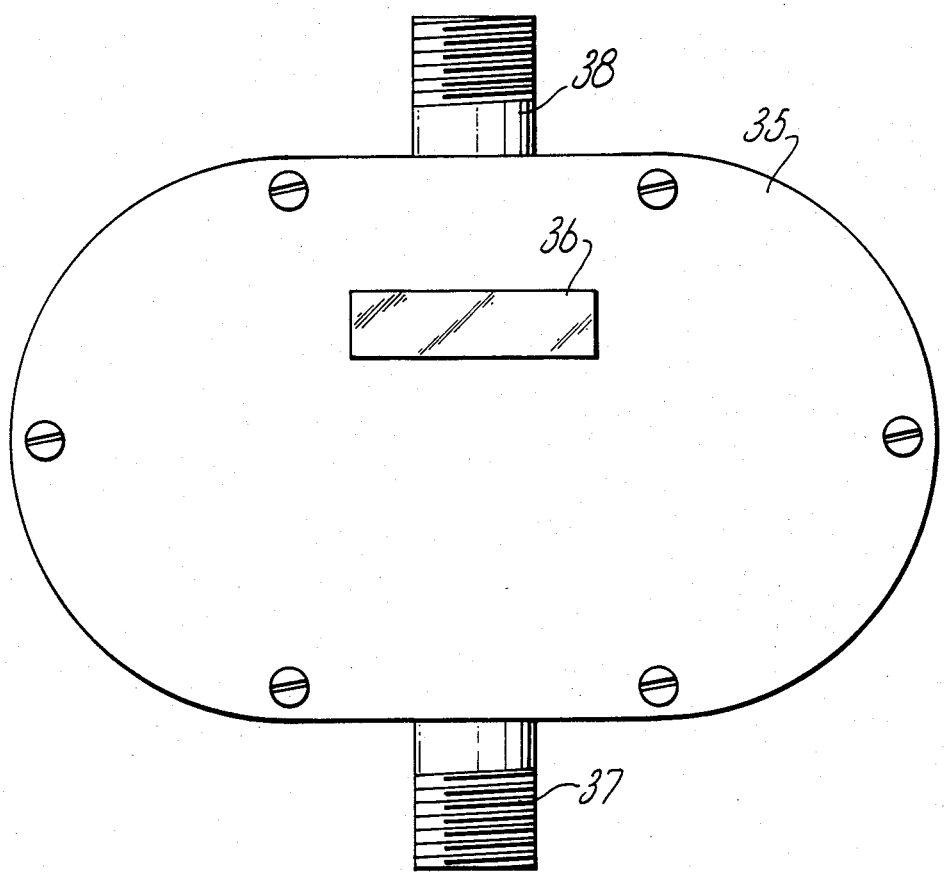
FIG. 9 shows a front view of the flowmeter.
Figure 10:
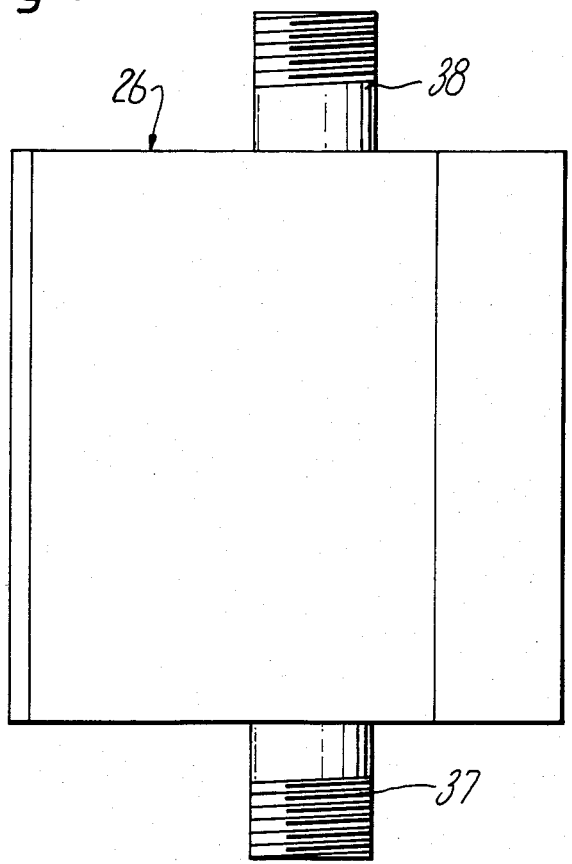
FIG. 10 shows a side view of the flowmeter.

FIG. 6 shows how the various parts of the meter are assembled together with injection moulded 60° nylon pin bearings 58, 60, 62 and 64 at the ends of the shafts 42 and 44, one bearing 58 or 60 for each shaft being sunk in the bulkhead 32 and another 62 or 64 in the rear cap 34.

On one side of the bulkhead 32, in the electronic component and counter housing 14, the printed circuit board 18 is mounted in the bulkhead, with the pick-up coil 20, field-effect transistors 22 and other electronic components 24, and also the liquid crystal display counter 16. The pick-up coil 20 is accommodated in a recess in the bulkhead 32 on the dry side thereof. A further recess, diametrically opposite the first, houses a second pick-up coil 66 connected to charge an integral nickel-cadmium cell 68 via a rectifier (not shown in FIG. 6). The cell is connected to power the various electronic components on the printed circuit board 18, including the liquid crystal display counter 16.

Operation of the flow meter is as follows.

As water under pressure enters the meter cavity 10 via the inlet 37, it drives the rotors 39 and 40 in opposite senses as indicated by the arrows in FIG. 3 to move around the inside of the semi-circular portions 28 of the cavity wall 26 before passing to the opposite side of the rotors and out of the cavity 10 via the outlet 38. Since the amount of water transferred in this from the inlet to the outlet is substantially the same for each full turn of the rotors 39 and 40, the flow of water through the meter is directly proportional to the speed of rotation of the rotors, or expressing this in another way, the total volume of water displaced is proportional to the total number of turns of the rotors. The gear wheels 46 and 48 or the rotors 39 and 40 respectively ensure that the rotors always turn through the same angles, albeit in opposite directions, over any given period of time. This ensures that the ovals are always touching one another along a line which is parallel to and between the shafts 42 and 44.

The number of times the rotors rotate over any given period of time is counted by means of the scintered magnet 50 in the rotor 39 which creates an electrical pulse in the pick-up coil 20 each time it passes by the latter. The coil 20 is thus able to detect the magnet 50. The pulses from the coil 20 are counted electronically and the stored total is displayed by means of the liquid crystal display counter 16 on the printed circuit board 18. The display thus gives a reading of the total volume of water which has passed through the meter since the counter 16 was last set to zero. The counter 16 is calibrated so that the reading on the display shows this volume in cubic meters.

The pulsed output from the other pick-up coil 66, created as the sintered magnet 52 in the rotor 40 passes by the coil, maintains a charge level in the nickel-cadmium cell 68. In addition to acting as a power source for the various electronic parts of the meter, the cell 68 maintains the stored total in the counter 16 during long periods of non-use.

This construction of the meter, with its reduced number of moving parts and self-powering features which eliminate the need for a driveshaft and gear train, retains the benefits of the previous meter while offering enhanced performance and reliability. It has the advantage of being capable of mass production by methods which cut out skilled assembly. The net result is a product that can now be produced at a fraction of the cost of equivalent existing models.

Figure 11:
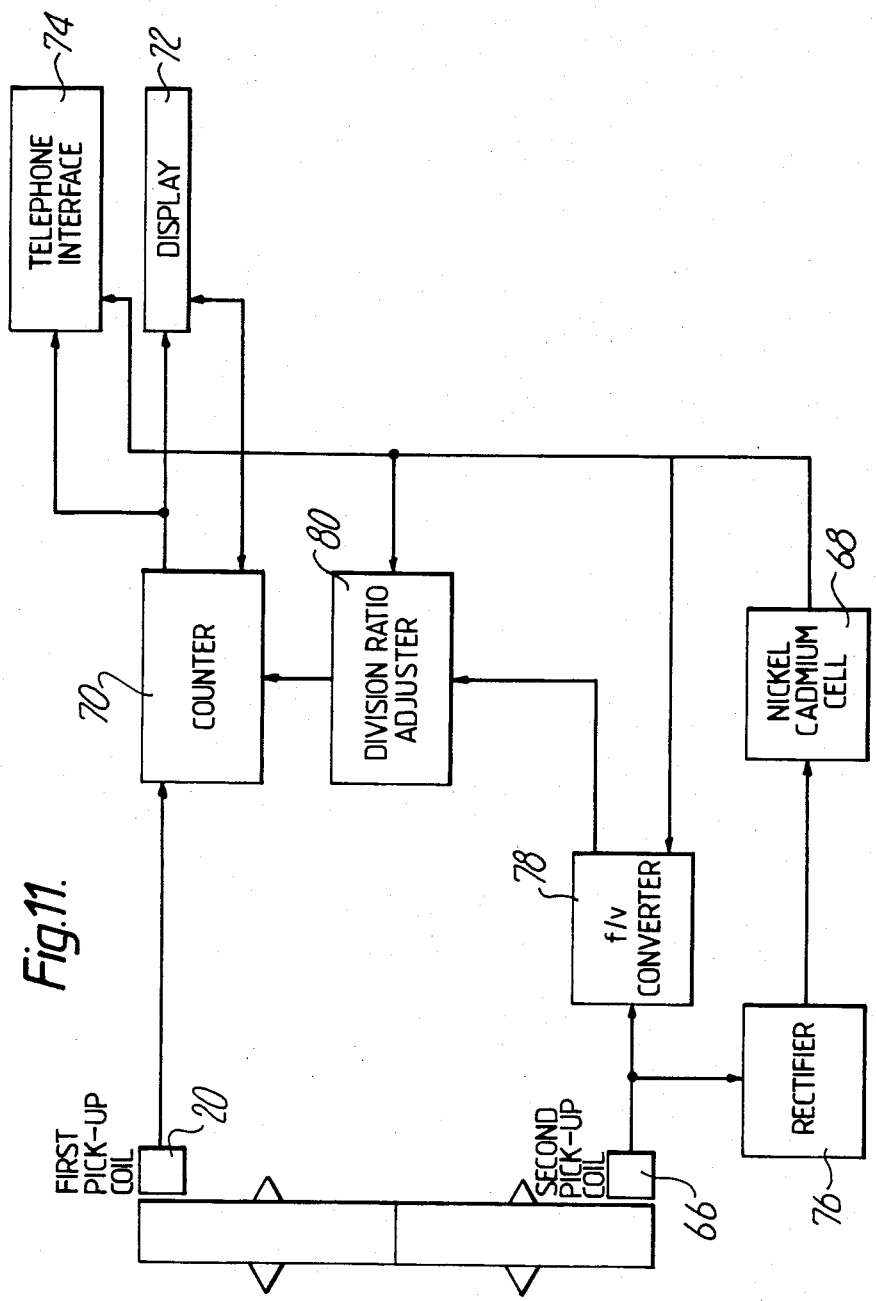
FIG. 11 is a block circuit diagram of the electronic circuitry of the meter.

FIG. 11 shows electronic circuitry which may be used in the meter. The first pick-up coil is connected to an electronic counter 70 of the liquid crystal display counter 16 of FIGS. 2 to 10. This counter 70 drives a liquid crystal display 72, and is also readable, via a telephone interface 74, by means of the user's telephone line. This allows the meter to be read directly by a central computer. The second pick-up coil 66 has a first output line to a rectifier 76 which charges the nickel-cadmium cell 68, and a second output line to a frequency/voltage converter 78. The cell 68 is connected to apply an operating voltage to the various parts of the circuitry. The frequency/voltage converter 78 is connected to apply a control voltage to a division ratio adjuster 80. The latter supplies a control signal to the counter 70 to adjust the division ratio of the latter. This calibrates the rate of count according to the flow rate through the meter, correcting for errors which would otherwise tend to arise for rates of flow at the upper and lower extremes of the meter's range.

Instead of using the frequency/voltage connector 78 to control the division ratio adjuster 80, the latter could be controlled directly by the frequency of the signal from the pick-up coil 66. It is also possible to use some other form of cell in place of the nickel-cadmium cell, and some other form of pick-up in place of the pick-up coils.

I claim:

1. A fluid meter comprising:
   (a) wall means defining a cavity;
   (b) an inlet to the cavity and an outlet from the cavity;
   (c) a rotor mounted within said cavity between said inlet and said outlet to rotate at a rate which is substantially proportional to flow of fluid through the meter;
   (d) detectable means fixed in relation to said rotor;
   (e) detector means capable of detecting said detectable means, arranged outside said cavity to provide a signal in dependence upon rotation of said rotor without being mechanically linked thereto;
   (f) measuring means connected to said detector means to provide a measure of the volume of fluid which flows through the meter from the signal from the detector means;
   (g) a flowrate indicator connected to said detector means to provide, from the signal therefrom, a signal indicative of the flowrate of fluid through the meter; and
   (g) a calibration adjuster connected between said flowrate indicator and said measuring means to adjust the calibration of said measuring means in dependence upon the signal from said flowrate indicator.

2. A meter according to claim 1, wherein there are two oval rotors mounted in said cavity to rotate in opposite senses about axes which are transverse in relation to fluid flow through the meter, the major axes of said two oval rotors being at substantially 90° to one another when one of them is at right angles to the direction of flow.

3. A meter according to claim 2, wherein intermeshing parts are provided on said two rotors to keep the second of rotation of each rotor the same as the other.

4. A meter according to claim 1, wherein the cavity wall means, the rotor, and the rotor shaft and bearings comprise a synthetic plastics material.

5. A meter according to claim 4, wherein the cavity wall means comprise a case and a bulkhead injection moulded as one part.

6. A meter according to claim 4, wherein the meter has a rotor shaft injection moulded in nylon.

7. A meter according to claim 4, wherein said rotor is provided with an encapsulated sintered magnet.

8. A fluid meter comprising:
   (a) wall means defining a cavity;
   (b) an inlet to the cavity and an outlet from the cavity;
   (c) a rotor mounted within said cavity between said inlet and said outlet to rotate at a rate which is substantially proportional to flow of fluid through the meter;
   (d) detectable means fixed in relation to said rotor;
   (e) detector means capable of detecting said detectable means, arranged outside said cavity to generate at least one electrical pulse for each revolution of said rotor without being mechanically linked thereto;
   (f) a counter connected to said detector means to count pulses generated by the detector means so as to provide a measure of the volume of fluid which flows through the meter from the signal from the detector means;
   (g) a display connected to the counter to display the count in the said counter;
   (h) a frequency-to-voltage converter connected to the detector means to provide a voltage signal having a magnitude in dependence upon the rate at which pulses are produced by the detector means; and
   (i) a division ratio adjuster having an input connected to said frequency-to-voltage converter and an output connected to said counter to adjust the calibration of said counter in dependence upon the signal from said frequency-to-voltage converter.

* * * * *